United States Patent
Niergarth et al.

(10) Patent No.: US 11,866,182 B2
(45) Date of Patent: *Jan. 9, 2024

(54) FUEL DELIVERY SYSTEM HAVING A FUEL OXYGEN REDUCTION UNIT

(71) Applicant: General Electric Company, Schenectady, NY (US)

(72) Inventors: Daniel Alan Niergarth, Norwood, OH (US); Brandon Wayne Miller, Liberty Township, OH (US); John Michael Pyles, West Chester, OH (US); Ethan Patrick O'Connor, Hamilton, OH (US); Justin Paul Smith, Montgomery, OH (US); William James Mailander, Beverly, MA (US)

(73) Assignee: General Electric Company, Schenectady, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 16/864,710

(22) Filed: May 1, 2020

(65) Prior Publication Data
US 2021/0339878 A1 Nov. 4, 2021

(51) Int. Cl.
*F02C 7/22* (2006.01)
*C25B 1/04* (2021.01)
(Continued)

(52) U.S. Cl.
CPC ......... *B64D 27/12* (2013.01); *B01D 19/0031* (2013.01); *B01D 19/0063* (2013.01);
(Continued)

(58) Field of Classification Search
CPC ........ B64D 27/12; B64D 13/06; B64D 37/32; B64D 2013/0603; B64D 2013/0677;
(Continued)

(56) References Cited

U.S. PATENT DOCUMENTS 2,582,842 A   1/1952   Messinger
2,720,313 A   10/1955  Pattison
(Continued)

FOREIGN PATENT DOCUMENTS

EP   2003311 A2   12/2008
EP   3018304 A1   5/2016
(Continued)

OTHER PUBLICATIONS

U.S. Appl. No. 16/178,898, filed Nov. 2, 2018.
(Continued)

*Primary Examiner* — Dung H Bui
(74) *Attorney, Agent, or Firm* — Dority & Manning, P.A.

(57) ABSTRACT

A fuel oxygen reduction unit assembly for a fuel system is provided. The fuel oxygen reduction unit assembly includes: a fuel oxygen reduction unit located downstream from the fuel source and defining a stripping gas flowpath and a liquid fuel flowpath, the fuel oxygen reduction unit comprising a means for transferring an amount of oxygen from a liquid fuel flow through the liquid fuel flowpath to a gas flow through the stripping gas flowpath; and an oxygen conversion unit in flow communication with the stripping gas flowpath configured to extract a flow of oxygen from a gas flow through the stripping gas flowpath, the oxygen conversion unit defining an oxygen outlet configured to provide the extracted flow of oxygen to an external system.

13 Claims, 9 Drawing Sheets

(51) Int. Cl.
  *B64D 27/12* (2006.01)
  *B64D 37/32* (2006.01)
  *B64D 13/06* (2006.01)
  *C01B 5/00* (2006.01)
  *B01D 19/00* (2006.01)

(52) U.S. Cl.
  CPC ............ *B64D 13/06* (2013.01); *B64D 37/32* (2013.01); *C01B 5/00* (2013.01); *C25B 1/04* (2013.01); *F02C 7/22* (2013.01); *B64D 2013/0603* (2013.01)

(58) Field of Classification Search
  CPC ........ B64D 2013/0681; B01D 19/0031; B01D 19/0063; C01B 5/00; C01B 13/0207; C01B 13/0251; C25B 1/04; F02C 7/22; F02C 3/22; F02C 3/30; Y02E 60/36; Y02T 50/50; Y02T 50/60
  See application file for complete search history.

(56) References Cited

U.S. PATENT DOCUMENTS

| | | | |
|---|---|---|---|
| 2,893,628 A | 7/1959 | Herman | |
| 2,969,653 A | 1/1961 | Trowbridge et al. | |
| 3,050,240 A | 8/1962 | Darnell | |
| 3,178,105 A | 4/1965 | Darnell | |
| 3,590,559 A | 7/1971 | Bragg | |
| 3,691,730 A | 9/1972 | Hickey et al. | |
| 3,847,298 A | 11/1974 | Hamilton | |
| 3,895,243 A | 7/1975 | Amend et al. | |
| 3,902,658 A | 9/1975 | Madsen | |
| 4,169,567 A | 10/1979 | Tamura | |
| 4,170,116 A | 10/1979 | Williams | |
| 4,449,372 A | 5/1984 | Rilett | |
| 4,503,682 A | 3/1985 | Rosenblatt | |
| 4,505,124 A | 3/1985 | Mayer | |
| 4,550,573 A | 11/1985 | Rannenberg | |
| 4,600,413 A | 7/1986 | Sugden | |
| 4,714,139 A | 12/1987 | Lorenz et al. | |
| 4,738,779 A | 4/1988 | Carroll et al. | |
| 4,755,197 A | 7/1988 | Benson et al. | |
| 4,773,212 A | 9/1988 | Griffin et al. | |
| 5,149,018 A | 9/1992 | Clark | |
| 5,267,608 A | 12/1993 | Coffinberry | |
| 5,341,636 A | 8/1994 | Paul | |
| 5,452,573 A | 9/1995 | Glickstein et al. | |
| 5,587,068 A | 12/1996 | Aho, Jr. et al. | |
| 5,622,621 A | 4/1997 | Kramer | |
| 5,667,168 A | 9/1997 | Fluegel | |
| 5,722,241 A | 3/1998 | Huber | |
| 5,724,806 A | 3/1998 | Homer | |
| 5,904,836 A | 5/1999 | Lee et al. | |
| 6,134,876 A | 10/2000 | Hines et al. | |
| 6,182,435 B1 | 2/2001 | Niggemann et al. | |
| 6,250,097 B1 | 6/2001 | Lui et al. | |
| 6,294,091 B1 | 9/2001 | Hoff | |
| 6,315,815 B1 | 11/2001 | Spadaccini et al. | |
| 6,415,595 B1 | 7/2002 | Wilmot, Jr. et al. | |
| 6,435,454 B1 | 8/2002 | Engelhardt | |
| 6,701,717 B2 | 3/2004 | Flatman et al. | |
| 6,702,729 B2 | 3/2004 | Mazzuca | |
| 6,892,710 B2 | 5/2005 | Ekstam | |
| 6,913,636 B2 | 7/2005 | Defrancesco et al. | |
| 6,939,392 B2 | 9/2005 | Huang et al. | |
| 7,093,437 B2 | 8/2006 | Spadaccini et al. | |
| 7,153,343 B2 | 12/2006 | Burlatsky et al. | |
| 7,260,926 B2 | 8/2007 | Sabatino et al. | |
| 7,334,407 B2 | 2/2008 | Spadaccini et al. | |
| 7,377,098 B2 | 5/2008 | Walker et al. | |
| 7,387,602 B1 | 6/2008 | Kirsch | |
| 7,398,641 B2 | 7/2008 | Stretton et al. | |
| 7,431,818 B2 | 10/2008 | Cipollini | |
| 7,459,081 B2 | 12/2008 | Koenig et al. | |
| 7,536,851 B2 | 5/2009 | McLain | |
| 7,569,099 B2 | 8/2009 | Coffin et al. | |
| 7,615,104 B2 | 11/2009 | Cordatos et al. | |
| 7,628,965 B2 | 12/2009 | Johnson et al. | |
| 7,632,338 B2 * | 12/2009 | Cipollini | B01D 19/0084 204/266 |
| 7,694,916 B2 | 4/2010 | Limaye et al. | |
| 7,735,670 B2 | 6/2010 | Zaki et al. | |
| 7,744,827 B2 | 6/2010 | Vanderspurt et al. | |
| 7,824,470 B2 | 11/2010 | Chiappetta et al. | |
| 7,836,680 B2 | 11/2010 | Schwarz et al. | |
| 7,882,704 B2 | 2/2011 | Chen | |
| 7,896,292 B2 | 3/2011 | Limaye et al. | |
| 7,905,259 B2 | 3/2011 | Johnson et al. | |
| 7,966,807 B2 | 6/2011 | Norris et al. | |
| 7,987,676 B2 | 8/2011 | Ast et al. | |
| 8,055,437 B2 | 11/2011 | Proietty et al. | |
| 8,141,360 B1 | 3/2012 | Huber | |
| 8,177,884 B2 | 5/2012 | Schmidt et al. | |
| 8,231,714 B2 | 7/2012 | Cornet et al. | |
| 8,261,258 B1 | 9/2012 | Chillar et al. | |
| 8,388,830 B2 | 3/2013 | Sohn et al. | |
| 8,450,020 B2 | 5/2013 | Sinha et al. | |
| 8,499,567 B2 | 8/2013 | Hagh et al. | |
| 8,499,822 B2 | 8/2013 | Bulin et al. | |
| 8,522,572 B2 | 9/2013 | Coffinberry et al. | |
| 8,602,362 B2 | 12/2013 | Buchwald | |
| 8,663,996 B2 | 3/2014 | Beeson | |
| 8,734,091 B2 | 5/2014 | Moniz et al. | |
| 8,765,070 B2 | 7/2014 | Norton et al. | |
| 8,789,377 B1 | 7/2014 | Brostmeyer | |
| 8,821,362 B2 | 9/2014 | Kidd et al. | |
| 8,828,344 B2 | 9/2014 | K-Wlam et al. | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,144,768 B2 | 9/2015 | Tichborne et al. | |
| 9,162,162 B2 | 10/2015 | Yount | |
| 9,231,267 B2 | 1/2016 | McAlister | |
| 9,435,246 B2 | 9/2016 | Devarakonda | |
| 9,567,095 B2 | 2/2017 | McCarthy et al. | |
| 9,580,185 B2 | 2/2017 | Rhoden et al. | |
| 9,656,187 B2 | 5/2017 | Lo et al. | |
| 9,687,773 B2 | 6/2017 | Johnson et al. | |
| 9,724,625 B2 | 8/2017 | Lo | |
| 9,752,507 B2 | 9/2017 | Selstad et al. | |
| 9,771,867 B2 | 9/2017 | Karam et al. | |
| 9,834,315 B2 | 12/2017 | Lo et al. | |
| 9,863,322 B2 | 1/2018 | Williams et al. | |
| 9,885,290 B2 | 2/2018 | Della-Fera et al. | |
| 9,897,054 B2 | 2/2018 | Lo et al. | |
| 9,994,331 B2 | 6/2018 | Family et al. | |
| 10,307,708 B2 | 6/2019 | Rheaume et al. | |
| 2003/0167993 A1 * | 9/2003 | Husain | B63J 4/002 114/74 R |
| 2008/0083608 A1 * | 4/2008 | Cipollini | B01D 19/0084 204/157.5 |
| 2008/0128048 A1 * | 6/2008 | Johnson | B64D 37/32 141/59 |
| 2008/0299432 A1 * | 12/2008 | Hoffjann | B64D 13/00 429/456 |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2011/0262309 A1 | 10/2011 | Limaye et al. | |
| 2012/0216502 A1 | 8/2012 | Freund et al. | |
| 2012/0216677 A1 | 8/2012 | Koenig et al. | |
| 2013/0186100 A1 | 7/2013 | Rhoden et al. | |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |

(56) References Cited

U.S. PATENT DOCUMENTS

| | | | |
|---|---|---|---|
| 2015/0068889 A1* | 3/2015 | Hansen | C25B 11/04 |
| | | | 204/252 |
| 2015/0072850 A1 | 3/2015 | Derrick et al. | |
| 2015/0159867 A1 | 6/2015 | Patrick et al. | |
| 2015/0314229 A1* | 11/2015 | Johnson | B01D 19/0026 |
| | | | 422/187 |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0138431 A1 | 5/2016 | Lear, Jr. | |
| 2016/0167802 A1 | 6/2016 | Lo et al. | |
| 2016/0208759 A1* | 7/2016 | Lo | F02M 59/46 |
| 2016/0245144 A1 | 8/2016 | Selberg et al. | |
| 2016/0290214 A1 | 10/2016 | Ekanayake et al. | |
| 2016/0305440 A1* | 10/2016 | Laboda | B01D 45/14 |
| 2016/0369700 A1 | 12/2016 | Ribarov et al. | |
| 2017/0030266 A1 | 2/2017 | Cerny et al. | |
| 2017/0096910 A1 | 4/2017 | Raimarckers et al. | |
| 2017/0113807 A1 | 4/2017 | Burnell et al. | |
| 2017/0114721 A1 | 4/2017 | Miller et al. | |
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0291714 A1 | 10/2017 | Corman | |
| 2018/0016025 A1 | 1/2018 | Rheaume et al. | |
| 2018/0038347 A1* | 2/2018 | Oroza | F16T 1/00 |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2019/0002111 A1 | 1/2019 | Bruno et al. | |
| 2019/0153952 A1* | 5/2019 | Niergarth | F02C 7/14 |
| 2019/0153953 A1 | 5/2019 | Niergarth et al. | |
| 2020/0086239 A1 | 3/2020 | Cordatos et al. | |
| 2020/0173035 A1* | 6/2020 | Yachi | C25B 1/04 |
| 2020/0355119 A1* | 11/2020 | Ribarov | F02C 7/224 |
| 2021/0156291 A1* | 5/2021 | O'Connor | F02C 7/224 |
| 2021/0178301 A1* | 6/2021 | Doherty | B01D 46/0004 |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 16/179,077, filed Nov. 2, 2018.

Kelburn Engineering, Landfill, Sewage, Biogas, Coal, Seam & Mines Gas Separation/Filtration, Kelburn Engineering—LandfillGas and Air Separation, 3 pages. http://www.kelburneng.co.uk/landfill-gas-bio-gas-sewer-gas.php.

* cited by examiner

FUEL DELIVERY SYSTEM HAVING A FUEL OXYGEN REDUCTION UNIT

FIELD

The present subject matter relates generally to a fuel oxygen reduction unit for a fuel delivery system of a vehicle.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel. However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen reduction systems have been proposed for such a purpose.

The inventors of the present disclosure have found that further efficiencies may be achieved based of the types of components utilized within the fuel oxygen reduction units. Accordingly, a fuel oxygen reduction unit taking advantage of these efficiencies would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen reduction unit assembly for a fuel system is provided. The fuel oxygen reduction unit assembly includes: a fuel oxygen reduction unit located downstream from the fuel source and defining a stripping gas flowpath and a liquid fuel flowpath, the fuel oxygen reduction unit comprising a means for transferring an amount of oxygen from a liquid fuel flow through the liquid fuel flowpath to a gas flow through the stripping gas flowpath; and an oxygen conversion unit in flow communication with the stripping gas flowpath configured to extract a flow of oxygen from a gas flow through the stripping gas flowpath, the oxygen conversion unit defining an oxygen outlet configured to provide the extracted flow of oxygen to an external system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
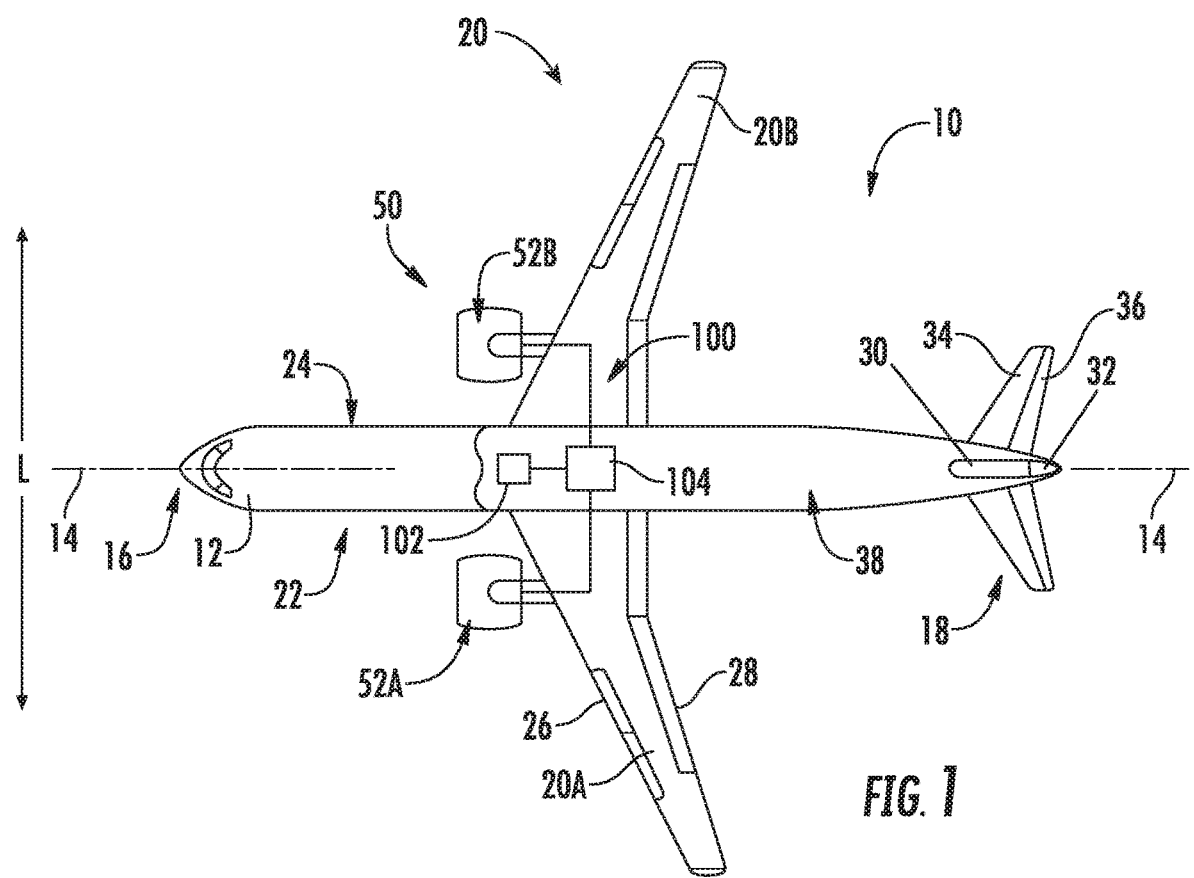
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As noted above, the inventors of the present disclosure have found that further efficiencies may be achieved within fuel oxygen reduction units based of the types of components utilized within the fuel oxygen reduction units. Accordingly, a fuel oxygen reduction unit taking advantage of these efficiencies would be useful.

The present disclosure provides for such benefits. More specifically, the present disclosure is generally related to a fuel oxygen reduction unit for a fuel system capable of providing multiple benefits simultaneously. More specifically, the present disclosure generally provides for a fuel system having a fuel oxygen reduction unit located downstream from a fuel source and defining a stripping gas flowpath and a liquid fuel flowpath. The fuel oxygen reduction unit includes a means for transferring an amount of oxygen from a liquid fuel flow through the liquid fuel flowpath to a gas flow through the stripping gas flowpath. The means may be a contactor and separator combination, a membrane-based system, a chemical infusion-based system, or some other mechanical or chemical means for transferring an amount of oxygen from a liquid fuel flow through the liquid fuel flowpath to a gas flow through the stripping gas flowpath.

The fuel oxygen reduction unit further includes an oxygen conversion unit in flow communication with the stripping gas flowpath configured to extract a flow of oxygen from a gas flow through the stripping gas flowpath, the oxygen conversion unit defining an oxygen outlet configured to provide the extracted flow of oxygen to an external system. In certain embodiments, the fuel system is a fuel system for an aircraft, and the external system is an accessory system of the aircraft. Alternatively, however, when the fuel system is for a different vehicle or non-vehicle system, the external system may be any other suitable system.

With the above configuration, the fuel oxygen reduction unit may provide further efficiencies by simultaneously reducing an oxygen content of a flow of liquid fuel (allowing such fuel to be taken to higher temperatures with a reduced risk of coking), while also extracting a flow of usable oxygen. In the context of an aircraft, such may allow for the aircraft to forego inclusion of potentially heavy and space-consuming oxygen tanks on-board.

Referring now to the drawings, wherein identical numerals indicate the same elements throughout the figures, FIG. 1 provides a top view of an exemplary aircraft 10 as may incorporate various embodiments of the present invention. The aircraft 10 defines a longitudinal centerline 14 that extends therethrough, a vertical direction (not shown), a lateral direction L, a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. A first wing 20A of such wings 20 extends laterally outwardly with respect to the longitudinal centerline 14 from a port side 22 of the fuselage 12 and a second wing 20B of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction or horizontal/lateral direction L. Further, the aircraft 10 may include any other suitable configuration of wings 20 (e.g., a canard configuration, blended wing configuration, etc.), fuselage 12, etc.

The exemplary aircraft 10 of FIG. 1 includes a propulsion system 50, herein referred to as "system 50". The exemplary system 50 includes one or more aircraft engines 52. For example, the embodiment depicted includes a plurality of aircraft engines 52, each configured to be mounted to the aircraft 10, such as to one of the pair of wings 20. More specifically, for the embodiment depicted, the aircraft engines 52 are configured as gas turbine engines, such as turbofan jet engines, attached to and suspended beneath the wings 20 in an under-wing configuration (it being appreciated that in other embodiments, the aircraft engines 52 may be any other suitable, at least partially combustion engines). For example, the aircraft engines 52 include a first aircraft engine 52A and a second aircraft engine 52B. The first aircraft engine 52A is configured to be mounted to the first wing 20A of the aircraft 10, and the second aircraft engine 52 is configured to be mounted to the second wing 20B of the aircraft 10 (i.e., on an opposite side of the aircraft 10). It will be appreciated that although only two aircraft engines 52 are depicted in FIG. 1, in other embodiments, the propulsion system 50 of the aircraft 10 may have any other suitable number and type of aircraft engines 52, mounted at any other suitable location (e.g., mounted to the wings, to the fuselage at the aft end of the aircraft 10, to one or stabilizers, etc.).

As is further depicted in FIG. 1, the aircraft 10 includes a fuel delivery system 100. More specifically, the fuel delivery system 100 is generally configured to supply the aircraft engines 52, i.e., the first aircraft engine 52A and the second aircraft engine 52B for the embodiment of FIG. 1, with an amount of fuel during operation. More specifically, for the embodiment shown, the fuel delivery system 100 is configured to provide the aircraft engines 52 with a relatively low oxygen content fuel during operation, as will be explained in greater detail below. In such a manner, it will be appreciated that the fuel delivery system 100 generally includes a fuel source 102 (e.g., a fuel tank) and a fuel oxygen reduction unit 104. The fuel oxygen reduction unit 104 is configured to receive fuel from fuel source 102, reduce an oxygen content of such fuel, and provide such fuel to the aircraft engines 52. Moreover, as will be explained in more detail with reference to FIGS. 2 and 3, below, the fuel oxygen reduction system 104 is further configured to reduce an oxygen content of an air within an ullage of the fuel source 102. Notably, as used herein, the term "fuel oxygen reduction unit" generally means a device capable of reducing a free oxygen content of the fuel, such as a fuel oxygen conversion unit, a fuel oxygen extraction unit, etc.

It will be appreciated, however, that in other exemplary embodiments, the aircraft 10 and/or engines 52 may have any other suitable configuration. For example, in other embodiments, the aircraft 10 may have other wing and/or fuselage designs, engine count and/or configuration or positioning, etc. Further, in other embodiments, the aircraft 10 may be, e.g., a vertical takeoff and landing aircraft, such as a helicopter. Other embodiments are contemplated as well.

It will also be appreciated that, although not depicted, the aircraft 10 may include one or more accessory system. For example, the aircraft 10 may include one or more oxygen-consuming accessory systems, such as cabin air maintenance system, cabin and/or crew oxygen delivery system, etc. As will be appreciated from the discussion below, the fuel oxygen reduction unit may include an oxygen conversion unit defining an oxygen outlet in airflow communication with the aircraft 10 for providing a flow of oxygen to the aircraft 10, such as to one or more of these oxygen-consuming accessory systems of the aircraft 10.

Figure 2:
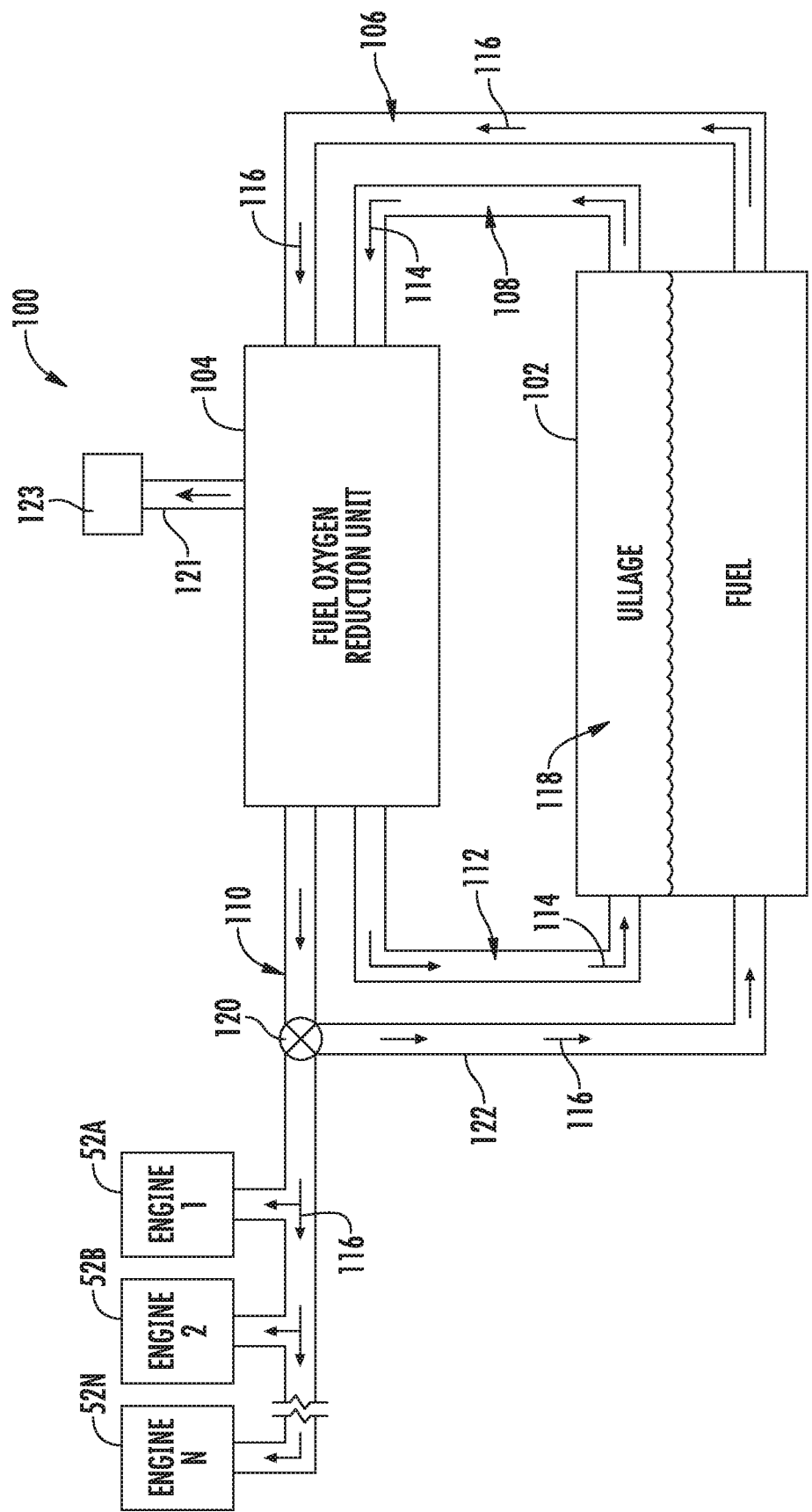
FIG. 2 is a schematic view of a fuel delivery system in accordance with an exemplary embodiment of the present disclosure.

More specifically, referring now briefly to FIG. 2, a schematic view of a fuel delivery system 100 as may be incorporated into the aircraft 10 of FIG. 1 is provided. As is depicted, the fuel delivery system 100 generally includes a fuel source 102 and a fuel oxygen reduction unit 104, and defines a plurality of flowpaths. Specifically, for the embodiment shown, the fuel delivery system 100, and the fuel oxygen reduction unit 104, generally defines a liquid fuel supply path 106, a stripping gas supply path 108, a liquid fuel outlet path 110, and a stripping gas return path 112. The stripping gas supply path 108 and stripping gas return path 112 are each in airflow communication with the fuel source 102 for receiving a flow of gas 114 from the fuel source 102 (which, as will be explained below, is a stripping gas) and providing the flow of gas 114 back to the fuel source 102. Similarly, for the embodiment shown, the liquid fuel supply path 106 is in fluid communication with the fuel source 102 for receiving a flow of liquid fuel 116 therefrom. Notably, for the embodiment shown, the fuel source 102 is configured as a fuel tank. Within the fuel tank, the fuel source 102 includes an amount of liquid fuel and an amount of vapor/air/gas. The space within the tank containing the vapor/air/gas (e.g., within the tank and above the fuel) may generally be referred to as the ullage 118. During operation, it will be appreciated that the fuel oxygen reduction unit 104 is generally configured to: receive the flow of air/gas 114 from the ullage 118 of the fuel source 102 and the flow of liquid fuel 116 from the fuel source 102, to reduce an oxygen content of each, to provide the relatively low oxygen content flow of gas 114 back to the ullage 118, and to provide the relatively low oxygen content flow of liquid fuel 116 to the aircraft engines 52. By reducing an oxygen content of the vapor/air/gas in the ullage 118, a risk of flame-ups or fires within the tank in case of a spark may be reduced. Further, by reducing an oxygen content of the liquid fuel 116 provided to the engines 52, an increased amount of heat may be added thereto with reduced risk of coking (allowing for increased efficiencies in the combustion process and providing an effective heat sink).

Specifically, for the embodiment shown, the fuel delivery system 100 is configured to provide fuel 116 having a relatively low oxygen content from the fuel oxygen reduction unit 104 to each of the plurality of aircraft engines 52, which for the embodiment shown includes a first aircraft engine 52A, a second aircraft engine 52B, up to an "Nth" aircraft engine 52N (e.g., three, four, five, six, etc. aircraft engines 52). In such a manner, it will be appreciated that the fuel deoxgenation unit 104 is fluidly coupled to each of the plurality of aircraft engines 52 through the liquid fuel outlet path 110, and is therefore configured to provide relatively low oxygen content liquid fuel 116 to each of such engines 52.

Notably, for the embodiment shown, fuel delivery system 100 further includes a return valve 120 and a return line 122 for returning an amount of relatively low oxygen content liquid fuel to the fuel source 102 in the event such fuel is not required by the aircraft engines 52. However, in other embodiments, the system 100 may be configured without the return valve 120 and return line 122 and may instead regulate the flow of liquid fuel 116 in other suitable manners.

In addition to the above, as will be explained in more detail below, it will be appreciated that the fuel oxygen reduction unit 104 may generally include a means for transferring an amount of oxygen from a flow of liquid fuel 116 through a liquid fuel flowpath of the fuel oxygen reduction unit 104 to a flow of gas 114 through a stripping gas flowpath of the fuel oxygen reduction unit 104. The fuel oxygen reduction unit 104 may generally also include an oxygen conversion unit in flow communication with the stripping gas flowpath configured to extract oxygen from the flow of gas 114 therethrough. The oxygen conversion unit defines an oxygen outlet in airflow communication with the aircraft through an oxygen delivery conduit 121. The oxygen delivery conduit 121 is, for the embodiment depicted, in airflow communication with an accessory system 123 of the aircraft 100.

A fuel delivery system 100 in accordance with such an exemplary embodiment, as will be discussed in greater detail below, may be capable of maintaining a relatively low oxygen content air within the ullage 118, while also providing relatively low oxygen content fuel to a plurality of aircraft engines 52, and while also generating a flow of pure oxygen that may be utilized by an accessory system of the aircraft or other aspect of the aircraft.

Figure 3:
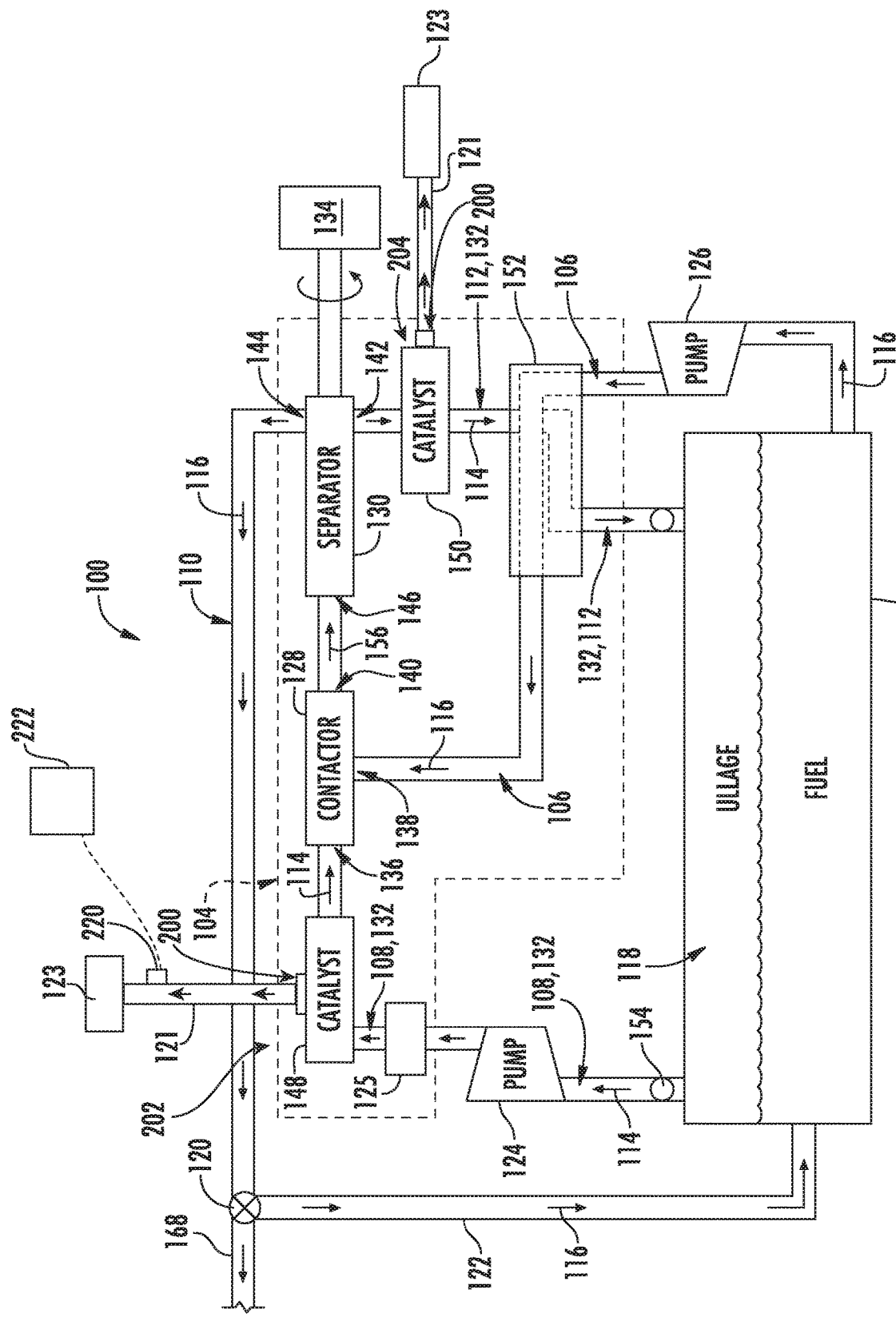
FIG. 3 is a close-up, schematic view of a section of a fuel delivery system in accordance with an exemplary embodiment of the present disclosure.

Referring now to FIG. 3, a more detailed, schematic drawing of a fuel delivery system 100 for an aircraft 10 in accordance with an exemplary embodiment of the present disclosure is provided. In at least certain exemplary embodiments, the exemplary fuel delivery system 100 depicted in FIG. 3 may be incorporated into, e.g., the exemplary aircraft 10 described above with reference to FIG. 1, and/or may be configured in a similar manner to the exemplary fuel delivery system 100 of FIG. 2. As such, it will be appreciated that the fuel delivery system 100 generally includes a fuel source 102 and a fuel oxygen reduction unit 104, and the fuel delivery system 100 and fuel oxygen reduction unit 104 generally defines a liquid fuel supply path 106, a stripping gas supply path 108, a liquid fuel outlet path 110, and a stripping gas return path 112. The stripping gas return path 112 and the stripping gas supply path 108 are, for the embodiment depicted, each in airflow communication with the fuel source 102.

Further, for the embodiment depicted, the liquid fuel supply path 106 of the fuel oxygen reduction unit 104 is in fluid communication with fuel source 102. In such a manner, it will be appreciated that the fuel oxygen reduction unit 104 is generally configured to receive a flow of liquid fuel 116 from the fuel source 102 and is further configured to receive a flow of gas 114 (referred to herein as "stripping gas") also from the fuel source 102. Further, as will be described in detail below, the fuel oxygen reduction unit 104 is configured to return the stripping gas 114 to the fuel source 102. As noted with reference to the embodiment above, for the embodiment of FIG. 3, the fuel source 102 generally includes an amount of liquid fuel 116 and defines an ullage 118 above the liquid fuel 116. The gas received through the stripping gas supply path 108 is received from the ullage 118, and the gas provided to the fuel source 102 through the stripping gas return path 112 is provided to the ullage 118.

In order to assist with the flow of stripping gas 114 from the fuel source 102, or rather from the ullage 118 of the fuel source 102, the fuel delivery system 100 includes an ullage pump 124 in airflow communication with the ullage 118 of the fuel source 102 and the stripping gas supply path 108 of the fuel oxygen reduction unit 104. Similarly, in order to assist with the flow of liquid fuel 116 from the fuel source 102, the fuel delivery system 100 includes a fuel pump 126 in fluid communication with the fuel source 102 and the liquid fuel supply path 106.

Further, for the embodiment depicted, the fuel oxygen reduction unit 104 defines a stripping gas flowpath 132, and generally includes a means for transferring an amount of oxygen from the flow of liquid fuel 116 through a liquid fuel flowpath to the flow of gas 114 through the stripping gas flowpath 132. Specifically, for the embodiment shown, the means includes a contactor 128 and a fuel gas separator 130. For the embodiment shown, the stripping gas flowpath 132 includes the stripping gas supply path 108 and the stripping gas return path 112. As such, the stripping gas flowpath 132 generally extends from a location upstream of the contactor 128, through the contactor 128 and separator 130, to a location downstream of the separator 130. In certain exemplary embodiments, the stripping gas flowpath 132 may be formed of any combination of one or more conduits, tubes, pipes, etc., as well as structures of components within the stripping gas flowpath 132.

It will be appreciated that the term "stripping gas" is used herein as a term of convenience to refer to a gas generally capable of performing the functions described herein. Specifically, for the embodiment depicted, the stripping gas 114 is substantially comprised of gas from the ullage 118 of the fuel source 102. As such, the stripping gas 114 may be made up primarily of atmospheric air. Additionally, or alternatively, the stripping gas 114 may be any other suitable gas, such as an inert gas or a substantially inert gas.

Referring still to the embodiment depicted, the fuel gas separator 130 is a mechanically-driven fuel gas separator 130 mechanically coupled to, and driven by, a power source 134. For the embodiment of FIG. 3, the power source 134 driving the fuel gas separator 130 may be any suitable power source, such as an electric motor, a hydraulic motor, a pneumatic motor, a combustion engine, a power source shared with other components, etc. However, in other embodiments, the fuel gas separator 130 and the power source 134 driving the fuel gas separator 130 may be configured in any other suitable manner.

As will be explained in more detail below, for the embodiment of FIG. 3, the contactor 128 generally defines a gas inlet 136, a liquid fuel inlet 138, and a fuel/gas mixture outlet 140. Further, the fuel gas separator 130 generally defines a gas outlet 142, a liquid fuel outlet 144, and a fuel/gas mixture inlet 146. The gas inlet 136 of the contactor 128 is in airflow communication with the stripping gas supply path 108, the liquid fuel inlet 138 of the contactor 128 is fluidly connected to the liquid fuel supply path 106, and the fuel/gas mixture outlet 140 of the contactor 128 is fluidly coupled to the inlet 146 of the fuel gas separator 130. Further, the gas outlet 142 of the separator 130 is in airflow communication with the stripping gas return path 112 of the stripping gas flowpath 132, and the liquid fuel outlet 144 of the separator 130 is fluidly connected with the liquid fuel outlet path 110.

Moreover, for the exemplary fuel oxygen reduction unit 104 depicted in FIG. 3, the exemplary fuel oxygen reduction unit 104 further includes an oxygen conversion unit in flow communication with the stripping gas flowpath 132 configured to extract oxygen from the flow of gas 114 therethrough. The oxygen conversion unit defines an oxygen outlet 200 configured to be in airflow communication with the aircraft.

More specifically, for the embodiment shown the oxygen conversion unit is a first oxygen conversion unit 202, and the fuel oxygen reduction unit 104 further includes a second oxygen conversion unit 204 in flow communication with the stripping gas flowpath 132, also configured to extract oxygen from the flow of gas 114 therethrough. The second oxygen conversion unit 204 similarly defining an oxygen outlet configured to be in airflow communication with the aircraft.

For the embodiment shown, the first oxygen conversion unit 202 includes a first catalyst 148 and the second oxygen conversion unit 204 includes a second catalyst 150. For the embodiment shown, the first catalyst 148 and the second catalyst 150 are each arranged in series flow along the stripping gas flowpath 132. More specifically, for the embodiment shown, the first catalyst 148 is positioned within the stripping gas flowpath 132 at a location upstream of the contactor 128 (and downstream of the ullage 118), and the second catalyst 150 is positioned within the stripping gas flowpath 132 at a location downstream of the separator 130 (and upstream of the ullage 118). It will be appreciated, however, that in other embodiments, listed components may be provided in any suitable flow order, not all listed components may be included, or additional components not listed may be included. Operation of the first and second oxygen conversion units 202, 204 will be explained in greater detail below.

Further, the exemplary fuel oxygen reduction unit 104 depicted in FIG. 3, additionally includes a heat exchanger 152 for reducing a temperature of the gas flowing into the ullage 118 of the fuel source 102.

During typical operations, stripping gas 114 is urged through the stripping gas supply flowpath 108 by the ullage pump 124, and across an upstream flame arrester 154. Briefly, the upstream flame arrester 154 may be configured to prevent a flame from crossing into the fuel source 102 from the stripping gas supply path 108, or vice versa. For the embodiment shown, the stripping gas 114 flows from the ullage pump 124 through a pre-heater 125 and into the first catalyst 148 of the first oxygen conversion unit 202. The pre-heater 125 may be configured to increase a temperature of the stripping gas 114 to, or above, an activation temperature of the first catalyst 148 (e.g., a minimum light off temperature of the first catalyst 148 that allows the first catalyst 148 to operate properly). Although the exemplary pre-heater 125 is depicted as a separate component from the first catalyst 148, in other embodiments, the pre-heater 125 may be integrated into the first catalyst 148, or otherwise included as part of the first oxygen conversion unit 202.

Referring still to FIG. 3, it will be appreciated that from the first catalyst 148, the stripping gas 114 is provided to the gas inlet 136 of the contactor 128. Simultaneously, liquid fuel 116 is urged by the fuel pump 126 from the fuel source 102 to and through the liquid fuel supply path 106. From the fuel pump 126, the liquid fuel 116 flows through the heat exchanger 152, wherein the liquid fuel 116 may accept heat from the flow of stripping gas 114 through the stripping gas return path 112. From the heat exchanger 152, the liquid fuel 116 flows, still through the liquid fuel supply path 106, to the liquid fuel inlet 138 of the contactor 128. Within the contactor 128, the stripping gas 114 received through the stripping gas inlet 136 is mixed with the flow of liquid fuel 116 received through the liquid fuel inlet 138 to generate a fuel/gas mixture 156. The fuel/gas mixture 156 generated within the contactor 128 is provided to the inlet 146 of the fuel gas separator 130.

Generally, it will be appreciated that during operation of the fuel oxygen reduction unit 104, the liquid fuel 116 provided through the liquid fuel supply path 106 to the contactor 128 may have a relatively high oxygen content. By contrast, the stripping gas 114 provided to the contactor 128 may have a relatively low oxygen content or other specific chemical structure. Within the contactor 128, the liquid fuel 116 is mixed with the stripping gas 114, resulting in the fuel/gas mixture 156. As a result of such mixing a physical exchange may occur whereby at least a portion of the oxygen within the fuel 116 is transferred to the stripping gas 114, such that the fuel component of the mixture 156 has a relatively low oxygen content (as compared to the fuel 116 provided through the liquid fuel supply path 106) and the stripping gas 114 component of the mixture 146 has a relatively high oxygen content (as compared to the stripping gas 114 provided through the stripping gas supply path 108 to the contactor 128).

Figure 4:
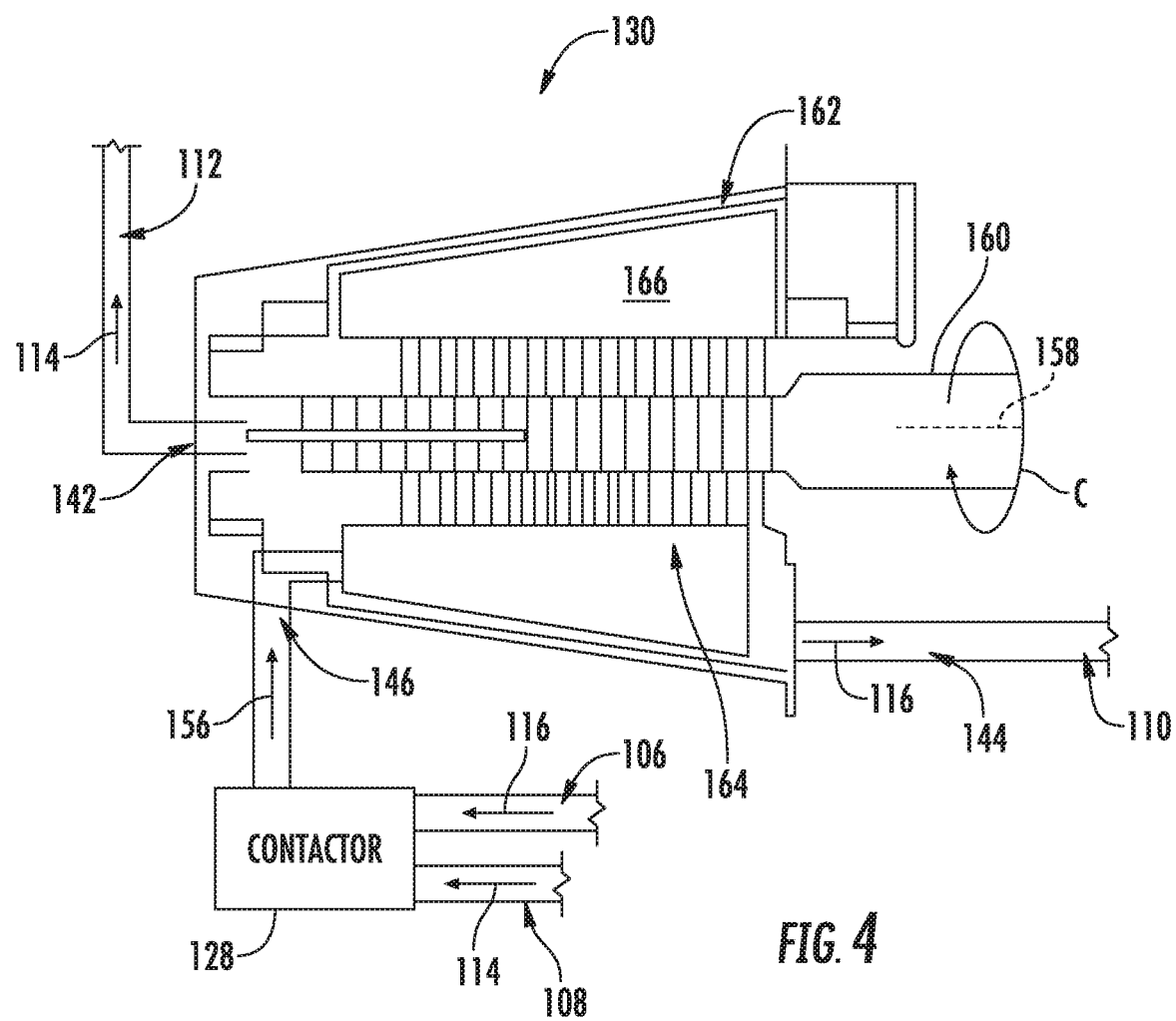
FIG. 4 is a schematic, close-up, cross-sectional view of a fuel gas separator of an exemplary fuel oxygen reduction unit of the fuel delivery system of FIG. 3 in accordance with an exemplary embodiment of the present disclosure.

Referring now also briefly to FIG. 4, providing a close-up, schematic, cross-sectional view of the exemplary fuel gas separator 130 of FIG. 3, it will be appreciated that within the fuel gas separator 130 the stripping gas 114 having a relatively high oxygen content is generally separated from the fuel 116 having a relatively low oxygen content. Specifically, for the embodiment shown, the fuel gas separator 130 defines a central axis 158 and a circumferential direction C extending about the central axis 158. Additionally, the fuel gas separator 130 is configured as a mechanically-driven fuel gas separator 130, or more specifically as a rotary/centrifugal fuel gas separator 130. Accordingly, the fuel gas separator 130 includes an input shaft 160 and a separation assembly 162, the input shaft 160 mechanically coupled to the separation assembly 162, the two components together rotatable about the central axis 158. Further, the input shaft 160 may be mechanically coupled to, and driven by, e.g., a suitable power source 134.

Additionally, the exemplary separation assembly 162 depicted generally includes an inner filter 164 arranged along the central axis 158, and a plurality of paddles 166 positioned radially outward of the inner filter 164. During operation, a rotation of the separation assembly 162 about the central axis 158, and more specifically, a rotation of the plurality of paddles 166 about a central axis 158 (i.e., in the circumferential direction C), may generally force heavier liquid fuel 116 outward and lighter stripping gas 114 inward through the inner filter 164. In such a manner, the liquid fuel 116 may exit through the liquid fuel outlet 144 of the fuel gas separator 130 and the stripping gas 114 may exit through the stripping gas outlet 142 of the fuel gas separator 130, as is indicated.

Accordingly, it will be appreciated that the liquid fuel 116 provided to the liquid fuel outlet 142, having interacted with the stripping gas 114, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 116 provided to the liquid fuel outlet 144 may an oxygen content of less than about five (5) parts per million ("ppm"), such as less than about three (3) ppm, such as less than about two (2) ppm, such as less than about one (1) ppm, such as less than about 0.5 ppm.

Further, it will be appreciated that the exemplary fuel gas separator 130 depicted in FIG. 4 is provided by way of example only. In other embodiments, the separator 130 may have any other suitable configuration for separating liquid fuel 116 from stripping gas 114. For example, in other embodiments, the separator 130 may instead be configured as another form of centrifugal separator, a gravity-assisted separator, or any other passive separator or powered separator, or combination thereof.

Referring now back to the schematic view of the fuel delivery system 100 in FIG. 3, the liquid fuel 116 from the liquid fuel outlet 144 of the separator 130 is provided through the liquid fuel outlet path 110. The liquid fuel outlet path 110 is fluidly coupled to a liquid fuel source line 168, which may provide the relatively low oxygen content fuel to the one or more engines 56 (see, e.g., FIG. 2). As with the embodiment of FIG. 2, the fuel delivery system 100 further includes a return valve 120 and a return line 122. Depending on a fuel demand of the one or more engines 56 (see FIG. 2), at least a portion of the fuel 116 through the liquid fuel outlet path 110 may be returned to the fuel source 102.

As is also depicted in FIG. 3, it will be appreciated that the exemplary fuel oxygen reduction unit 104 returns the stripping gas 114 utilized to the ullage 118 of the fuel source 102. As noted, the stripping gas 114 to be returned to the ullage 118, i.e., downstream of the separator 130 and through the stripping gas return path 112, may have a relatively high oxygen content. Accordingly, as is also noted above, the fuel oxygen reduction unit 104 further includes the second oxygen conversion unit 204 having the second catalyst 150. The stripping gas 114 from the gas outlet 142 of the separator 130 is provided to the second catalyst 150 wherein an oxygen content of such gas 114 is reduced. The second catalyst 150 is positioned in airflow communication with the stripping gas return path 112 to reduce the oxygen content of stripping gas 114 flowing through the stripping gas return path 112, prior to returning such stripping gas 114 to the ullage 118 of the fuel source 102. It will be appreciated, that in certain exemplary embodiments, the second catalyst 150 may operate in a manner similar to the operations described above with reference to the first catalyst 148.

Referring still to the embodiment of FIG. 3, the stripping gas 114 through the stripping gas return path 112 is further cooled downstream of the second catalyst 150 through the heat exchanger 152. The resulting cooled and relatively low oxygen content stripping gas 114 is then provided through the remainder of the stripping gas flowpath 132, or rather the stripping gas return path 112, back to the ullage 118 of the fuel source 102.

Referring still to FIG. 3, operation of the first and second oxygen conversion units 202, 204 will now be described in more detail.

Referring first to the first oxygen conversion unit 202, within the first catalyst 148, the oxygen content of the stripping gas 114 is reduced. For example, the first catalyst 148 (or other gas oxygen reduction unit, discussed below) may be configured to reduce an oxygen content of the stripping gas 114 to less than about three percent (3%) oxygen ($O_2$) by mass, such less than about one percent (1%) oxygen ($O_2$) by mass.

More specifically, within the first catalyst 148, the potentially relatively oxygen-rich stripping gas 114 may be reacted to reduce the oxygen content thereof. It will be appreciated, however, that first catalyst 148 may be configured in any suitable manner to reduce an oxygen content of the stripping gas 114. For example, in certain embodiments, the first catalyst 148 may be configured to react the fuel-vapor rich stripping gas 114 with elements inside the first catalyst 148 to provide a relatively oxygen-free stripping gas 114 upon exit. For example, the first catalyst 148 may include geometries of catalytic components through which the relatively oxygen-rich stripping gas 114 flows to reduce an oxygen content thereof. Such reaction may utilize at least in part a fuel content of the stripping gas 114 present by virtue of the stripping gas 114 originating in the fuel source 102 (i.e., being in contact with the fuel therein).

Figure 5:
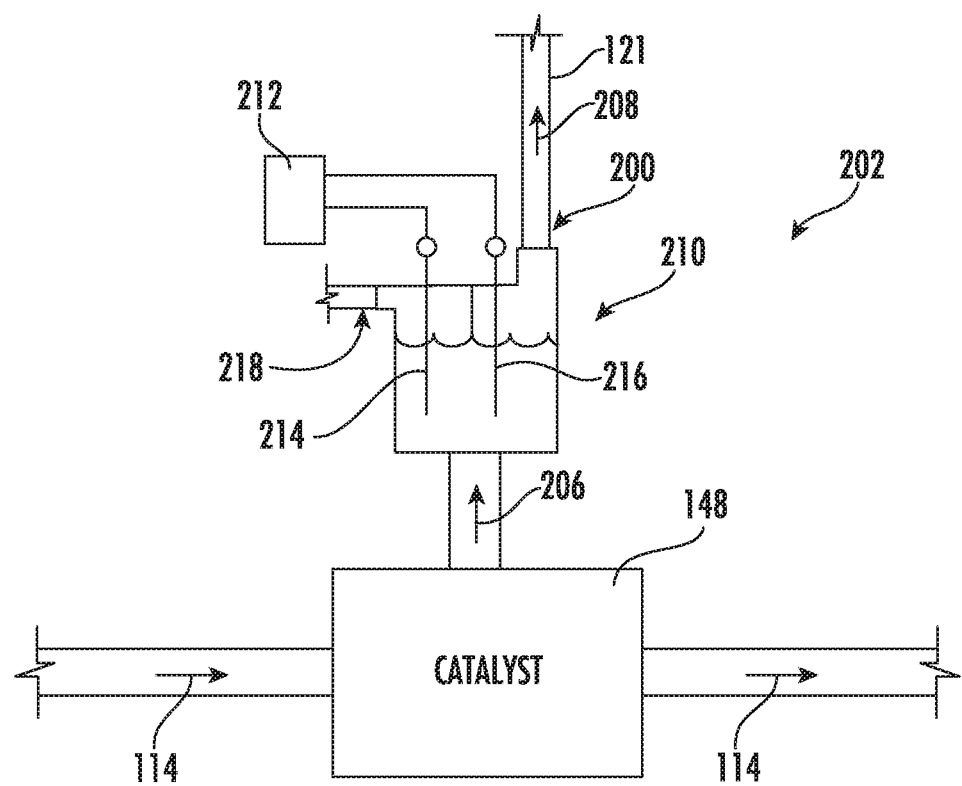
FIG. 5 is a close-up, schematic view of an oxygen conversion unit in accordance with an exemplary embodiment of the present disclosure.

Referring now briefly to FIG. 5, providing a close-up view of the exemplary first oxygen conversion unit 202 including the first catalyst 148, it will be appreciated that the first catalyst 148 may be configured to generate a flow of water 206 from the flow of gas 114 through the stripping gas flowpath 132. Further, the first oxygen conversion unit 202 further includes a water hydrolysis device for generating a flow of oxygen 208 from the water 206 generated by the first catalyst 148. More specifically, for the embodiment shown, the water hydrolysis device is a water electrolysis device 210. The water electrolysis device 210 is in fluid communication with the first catalyst 148 for receiving the flow of water 206 from the first catalyst 148, and is configured to break the water up into hydrogen and oxygen. The water electrolysis device 210 is in electrical communication with a power source 212, such as a direct current power source, and includes two electrodes—a cathode 214 and an anode 216—electrically coupled to the power source 212 and positioned in the water 206. During typical operation, hydrogen will appear at the cathode 214 (where electrons enter the water 206), and oxygen will appear at the anode 216. The amount of oxygen and hydrogen generated is proportional to a total electrical charge conducted by the water.

As is depicted schematically in FIG. 5, the pure oxygen may be captured and provided to the oxygen outlet 200 of the first oxygen conversion unit 202, and to the conduit 121. Similarly, the hydrogen may also be captured transferred through a hydrogen outlet 218 and utilized by the aircraft, and/or one of the aircraft's engines or accessory systems.

Such a configuration may therefore generate a flow usable oxygen 208 to assist with various aircraft operation, while also reducing a water content of the flow of fuel 116 by reducing the water content of the flow of stripping gas 114.

Referring now back to FIG. 3, it will further be appreciated that the fuel delivery system 100 further includes a sensor 220 operable with the fuel oxygen reduction unit for sensing data indicative of a gas flow through the oxygen outlet 200 of the first oxygen conversion unit 202 and a controller 222. More specifically, the sensor 220 is configured to sense data indicative of an oxygen content of the gas flow through the oxygen outlet 200, of a fuel content of the gas flow through the oxygen outlet 200, or both. In such a manner, the sensor 220 may be configured to sense data indicative of a purity of the oxygen flow, amount of the oxygen flow, etc. through the oxygen outlet 200.

The controller 208 is configured to receive such data from the sensor 220 and may make control decisions based on such data. In one or more exemplary embodiments, the controller 208 depicted in FIG. 3 may be a stand-alone controller 208 for the fuel delivery system 100, or alternatively, may be integrated into one or more of a controller for the aircraft with which the fuel delivery system 100 is integrated, a controller for a gas turbine engine receiving fuel from the fuel delivery system 100, etc.

As used herein, the term "controller" broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the controller 222 may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the controller 222 may include one or more input channels and/or one or more output channels. The input channels may be, but are not limited to, sensors, such as sensor 220. Furthermore, in the exemplary embodiment, the output channels may include, but are not be limited to, an operator interface monitor, or the output channels may be linked to various components to control such components based, e.g., on data reviewed from the input channels and/or data or instructions stored in the memory. For example, the memory may store software or other instructions, which when executed by the controller or processor allow the controller to perform certain operations or functions.

In such a manner, it will be appreciated that the fuel oxygen reduction unit 104 may be configured to simultaneously reduce an oxygen content a liquid fuel 116 provided to one or more aircraft engines 52 of an aircraft 10 including the fuel delivery system 100, while at the same time generate a usable flow of oxygen that may be provided to the aircraft, such as to one or more components of the aircraft (e.g., one or more of the engines), to one or more accessory systems of the aircraft (such as to the cabin and/or crew), etc.

It will be appreciated, however, that in other exemplary embodiments, the fuel delivery system 100 may be configured in any other suitable manner. For example, the fuel delivery system 100 may not provide low oxygen content fuel to each, or even a plurality, of aircraft engines. Further, it will be appreciated that for the embodiment shown, the ullage 118 having the oxygen content of its air being reduced is the ullage 118 of the fuel source 102 providing the liquid fuel 116 through the liquid fuel supply path 106 for the fuel oxygen reduction unit 104. However, in other embodiments, the ullage 118 may be of any other suitable fuel source, such that the fuel oxygen reduction unit 104 is operable with more than one fuel source. For example, in certain embodiments, the fuel oxygen reduction unit 104 may be operable with a primary fuel tank and a separate, secondary fuel tank.

Further, in still other exemplary embodiment, the fuel oxygen reduction unit 104 may not receive a flow of gas from the ullage 118, and instead the flow of gas 114 to the fuel oxygen reduction unit 104 may entirely or primarily be provided from some other gas source (e.g., a bleed air from an engine of the aircraft, an ambient air source, a stripping gas tank, etc.).

Moreover, it will be appreciated that in still other exemplary embodiments, the fuel delivery system 100 may instead be configured in any other suitable manner. For example, referring now to FIG. 6, a fuel delivery system 100 in accordance with another exemplary embodiment of the present disclosure is provided. The exemplary fuel delivery system 100 of FIG. 6 may be configured in substantially the same manner as the exemplary fuel delivery system 100 of FIG. 3.

Figure 6:
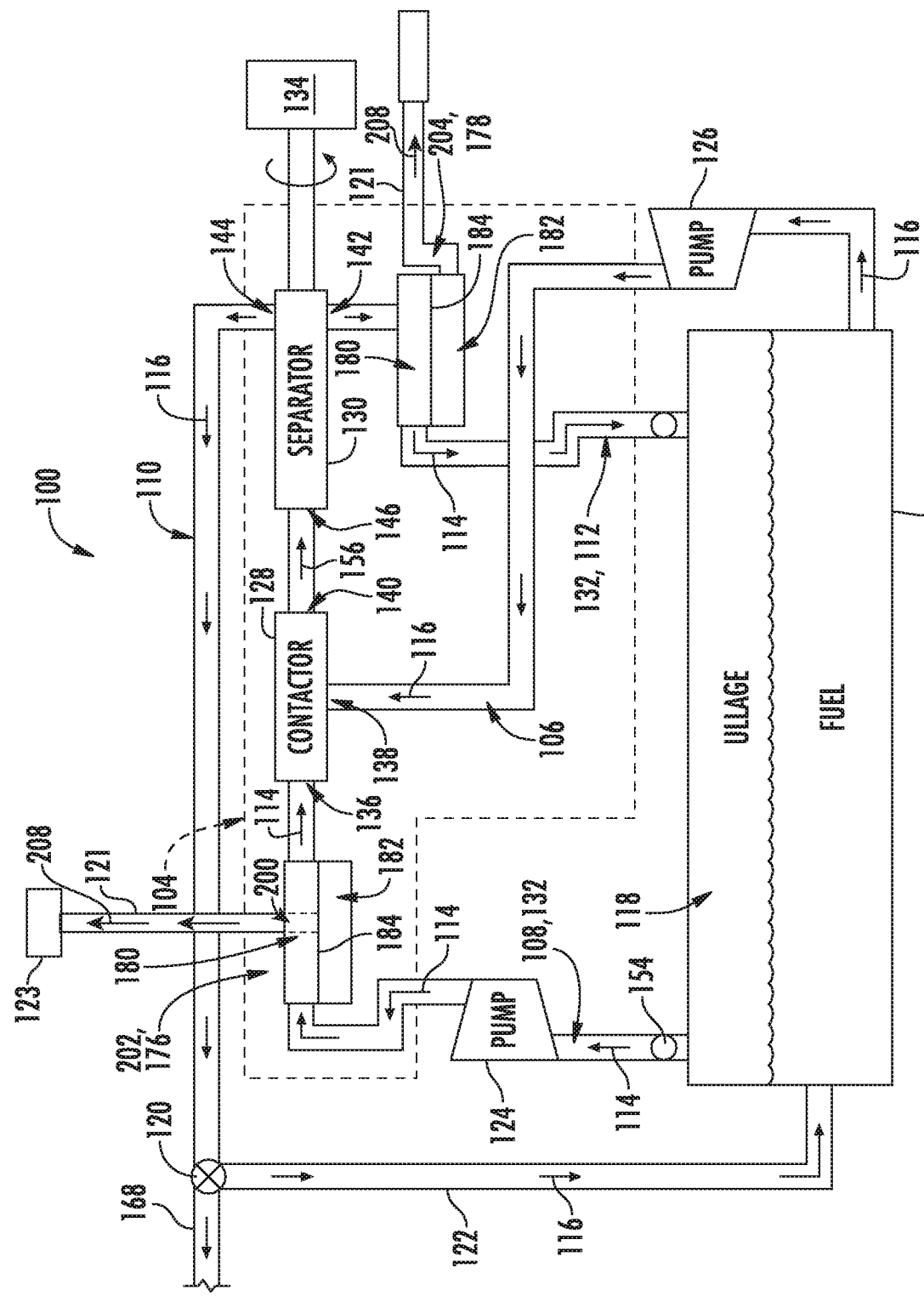
FIG. 6 is a close-up, schematic view of a section of a fuel delivery system in accordance with another exemplary embodiment of the present disclosure.

However, by contrast to the embodiment of FIG. 3, for the exemplary fuel delivery system 100 of FIG. 6, the first oxygen conversion unit 202 and second oxygen conversion unit 204 do not include catalysts (i.e., the first catalyst 148 and second catalyst 150), and instead include a static member for extracting oxygen from the flow of gas 114 through the stripping gas flowpath 132. More specifically, the first oxygen conversion unit 202 includes a first membrane gas oxygen reduction unit 176 and the second oxygen conversion unit 204 includes a second membrane gas oxygen reduction unit 178, respectively. The first membrane gas oxygen reduction unit 176 is positioned in the stripping gas supply path 108/stripping gas flowpath 132 downstream (for the embodiment shown) of a boost pump 124 and upstream of a means for transferring an amount of oxygen from a liquid fuel flow to a gas flow, or rather upstream of the contactor 128 and separator 130 for the embodiment shown. The second membrane gas oxygen reduction unit 178 is positioned in the stripping gas return path 112/stripping gas flowpath 132 downstream of the fuel oxygen reduction assembly—i.e., the contactor 128 and separator 130 for the embodiment shown—and upstream of the ullage 118 of the fuel source 102.

Each of the first and second membrane gas oxygen reduction units 176, 178 may be configured in any suitable manner for reducing an oxygen content of the stripping gas 114 flowing through the respective portions of the stripping gas flowpath 132. For the embodiments shown, the first and second membrane gas oxygen reduction units 176, 178 each generally define a gas flow chamber 180, through which the stripping gas 114 flows and an oxygen reduction chamber 182, and includes a membrane 184. The oxygen reduction chamber 182 and membrane 184 may have any suitable configuration for extracting oxygen from the stripping gas 114 flowing through the gas flow chamber 180. For example, the oxygen reduction chamber 182 may be a relatively low pressure chamber (e.g., vacuum) and the membrane 184 may be an oxygen permeable membrane allowing for oxygen within the stripping gas 114 within the gas flow chamber 180 to migrate thereacross into the oxygen reduction chamber 182. More specifically, the membrane 184 may define a porous structure configured to filter out oxygen from the gas flow through the gas flow chamber 180/stripping gas flowpath 132.

However, other configurations are contemplated as well, including various other chamber and membrane geometries.

It will be appreciated that with such a configuration, a preheater (such as preheater 125 of FIG. 3) may not be required, such that a heat exchanger (such as heat exchanger 152) may also not be required.

In such a manner, a flow of oxygen 208 may be extracted from the flow of gas 114 within the oxygen reduction chamber 182, and may be provided through an outlet 200 and to an aircraft via a conduit 121, such that the aircraft may utilize the flow of oxygen within, e.g., an oxygen-consuming accessory system.

It will further be appreciated that although the exemplary fuel oxygen reduction unit 104 includes the first and second membrane gas oxygen reduction units 176, 178 with the first and second oxygen reduction units 202, 204, in other embodiments the features of the fuel delivery system 100 of FIG. 6 may be combined with one or more of the features of the exemplary fuel delivery systems 100 of FIGS. 3 through 5. For example, in other embodiments one of the first or second membrane gas oxygen reduction units 176, 178 may instead be configured as a catalyst. Alternatively, in other embodiments, the fuel delivery system 100 may only include one of the first or second oxygen reduction units 202, 204 (particularly in embodiment having a closed loop stripping gas flowpath—see FIG. 8).

Figure 7:
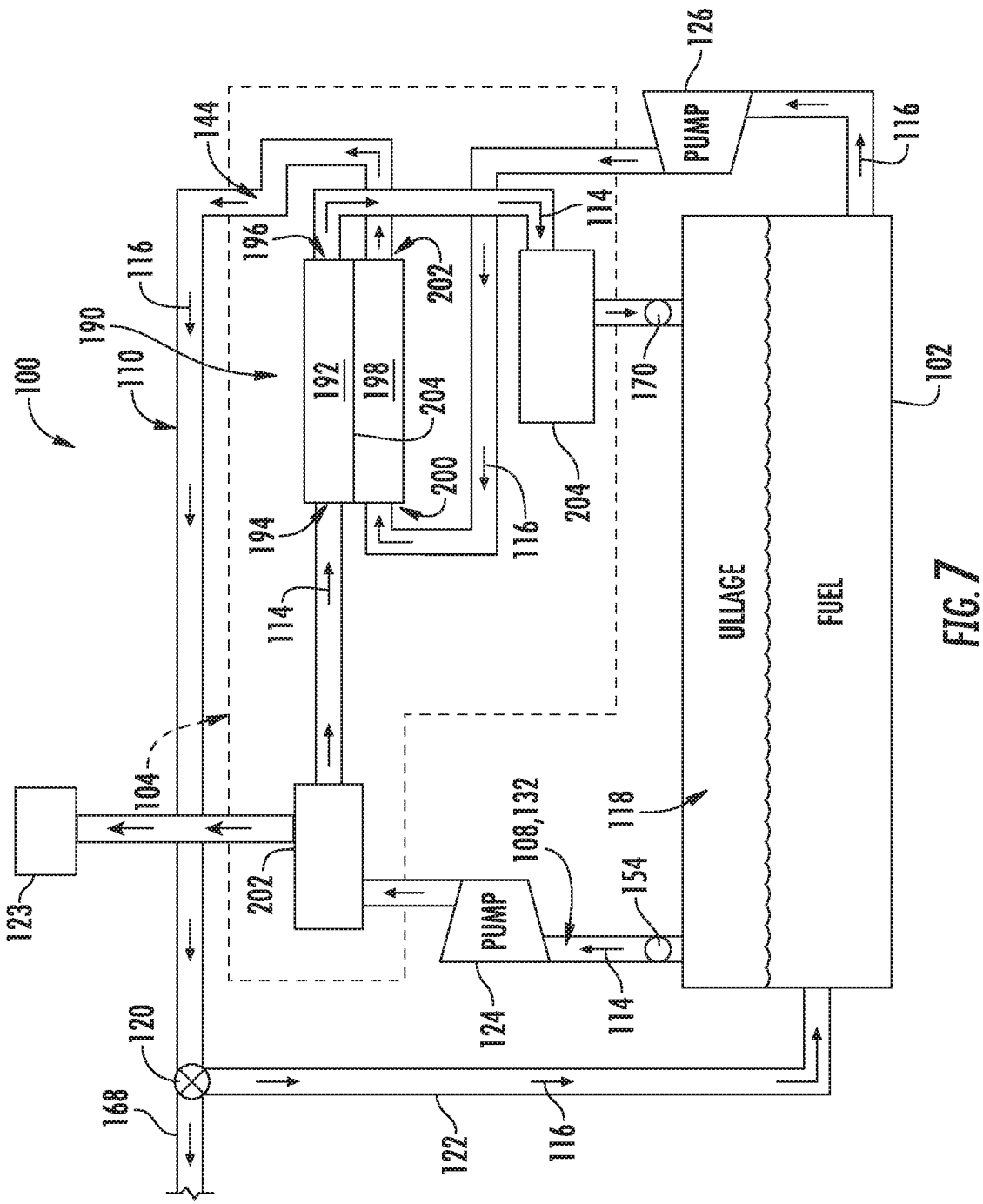
FIG. 7 is a close-up, schematic view of a section of a fuel delivery system in accordance with yet another exemplary embodiment of the present disclosure.

Moreover, it will be appreciated that in still other exemplary embodiments, other configurations are contemplated as well. For example, referring now to FIG. 7, a fuel delivery system 100 in accordance with still another exemplary embodiment of the present disclosure is provided. The exemplary fuel delivery system 100 of FIG. 7 may be configured in substantially the same manner as the exemplary fuel delivery system 100 of FIG. 3.

However, for the embodiment depicted, the means for transferring an amount of oxygen from a liquid fuel flow through the liquid fuel flowpath to a gas flow through the stripping gas flowpath is not configured as a contactor and a separator, and instead is configured as a membrane fuel oxygen reduction unit 190. The membrane fuel oxygen reduction unit 190 defines a stripping gas chamber 192 defining a gas inlet 194 and a gas outlet 196, as well as a fuel chamber 198, defining a fuel inlet 200 and a fuel outlet 202. The membrane fuel oxygen reduction unit 190 further includes a membrane 204 positioned between the stripping gas chamber 192 and fuel chamber 198. The membrane 204 may be any suitable membrane for allowing the migration of an oxygen containing gas within the liquid fuel 116 flowing through the fuel chamber 198 to the stripping gas 114 flowing through the stripping gas chamber 192. For example, the membrane 204 may be any suitable oxygen permeable membrane.

Such a configuration may allow for the reduction of oxygen within the flow of liquid fuel 116 provided to the engines 50, while utilizing less mechanical work.

It will further be appreciated that in still other exemplary embodiments, still other configurations are contemplated. For example, referring now to FIG. 8, a fuel delivery system 100 in accordance with still another exemplary embodiment of the present disclosure is provided. The exemplary fuel delivery system 100 of FIG. 8 may be configured in substantially the same manner as the exemplary fuel delivery system 100 of FIG. 3.

Figure 8:
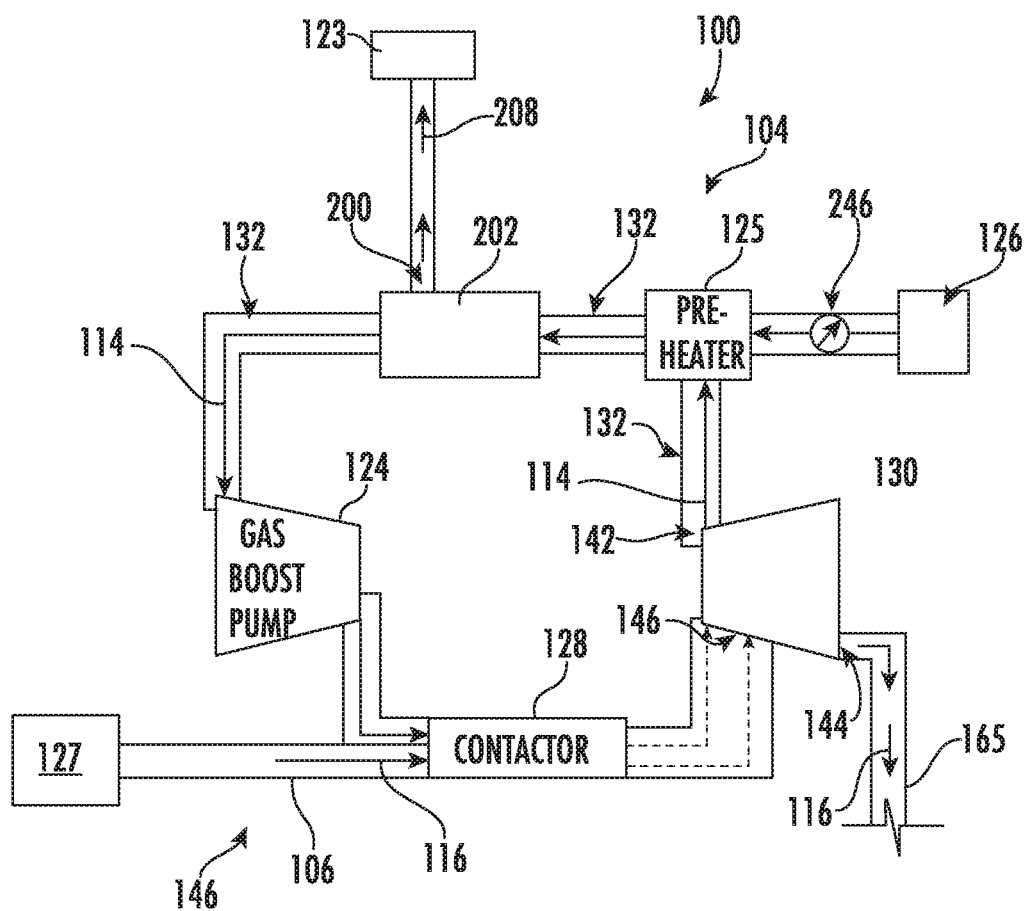
FIG. 8 is a close-up, schematic view of a section of a fuel delivery system in accordance with still another exemplary embodiment of the present disclosure.

For example, the exemplary fuel delivery system 100 of FIG. 8 generally includes a fuel oxygen reduction unit 104 having contactor 128 and a fuel gas separator 130. However, for the embodiment depicted, the fuel oxygen reduction unit 104 is not in airflow communication with a fuel source 127, such as an ullage of a fuel tank. Instead, the exemplary fuel oxygen reduction unit 104 depicted is configured to receive the flow of gas from an air source 126 separate from the fuel source 127. More particularly, the exemplary fuel oxygen reduction unit 104 is generally configured to recirculate a flow of stripping gas 114, and is in airflow communication with the air source 126 to supplement the volume of stripping gas 114 (e.g., to accommodate some leakage, stripping gas integration with the fuel flow, etc.), to provide an initial flow of stripping gas 114 to the fuel oxygen reduction unit 104, etc. In such a manner, it will be appreciated that the stripping gas 114 flowing through the stripping gas flowpath 132/circulation gas flowpath may be an inert gas, such as Nitrogen or Carbon Dioxide ($CO_2$), an inert gas mixture, or some other gas or gas mixture having a relatively low oxygen content.

It will be appreciated, however, that in other exemplary embodiments, any other suitable fuel oxygen reduction unit 104 may be provided. For example, in other exemplary embodiments, the fuel oxygen reduction unit 104 may not include all of the structure depicted in one or more of these embodiments, may include any combination of the structures depicted in these embodiment, and/or may include any other suitable structure or components to facilitate the reduction in an oxygen content of a fuel flow, while generating a separate oxygen flow for, e.g., an aircraft.

Figure 9:
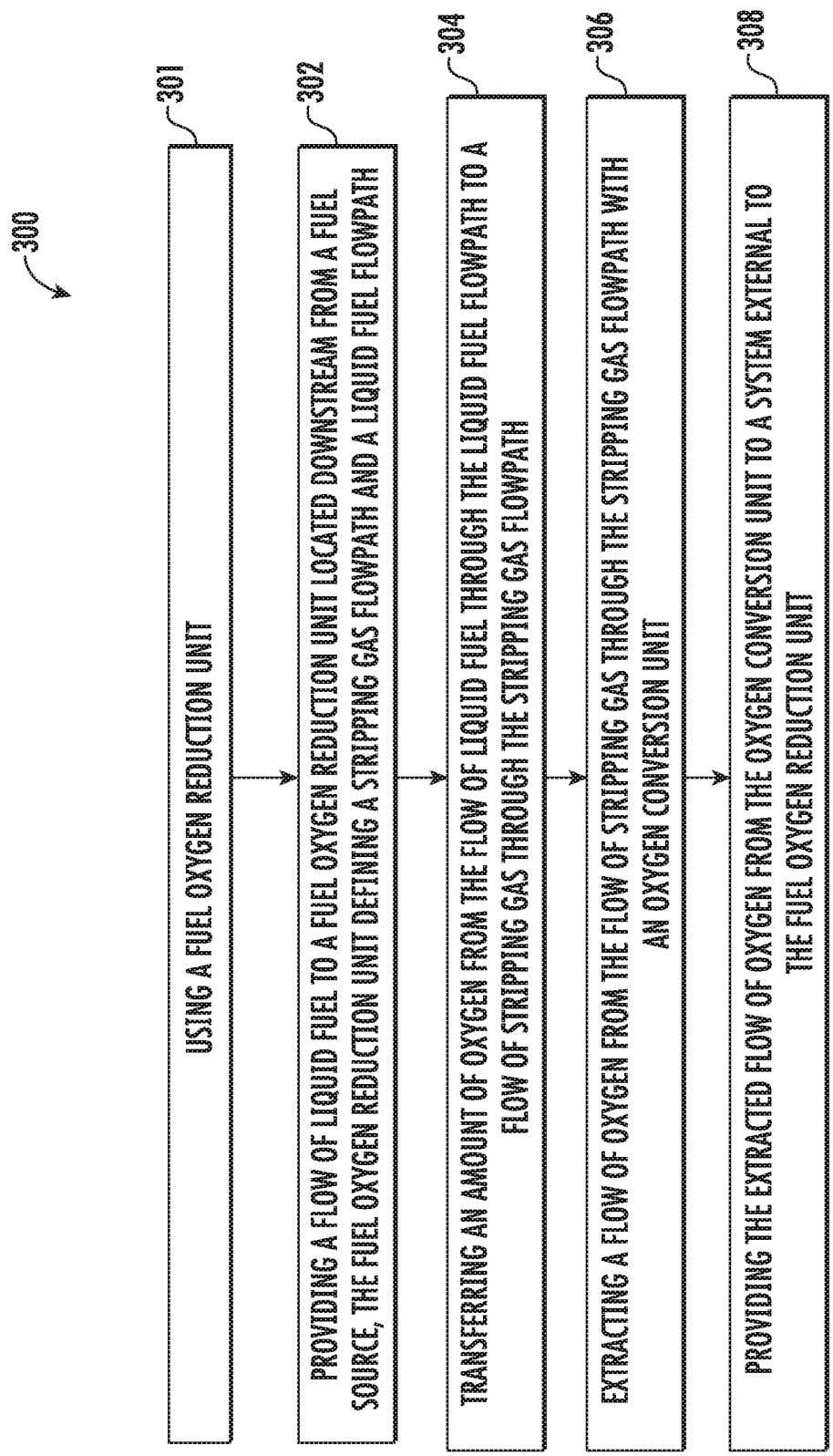
FIG. 9 is a flow diagram of a method of operating a fuel oxygen reduction unit.

Referring now to FIG. 9, a flow diagram of a method 300 of operating a fuel oxygen reduction unit for a fuel system is provided. The method 300 may be utilized with one or more of the exemplary fuel oxygen reduction units described above, or alternatively may be utilized with any other suitable fuel oxygen reduction unit.

The method 300 includes at (301) using a fuel oxygen reduction unit. For the exemplary aspect depicted, using a fuel oxygen reduction unit at (301) generally includes extracting oxygen from liquid fuel, and providing the extracted oxygen to an external system.

More specifically, for the exemplary aspect depicted, using the fuel oxygen reduction unit at (301) includes (302) providing a flow of liquid fuel to a fuel oxygen reduction unit located downstream from a fuel source, the fuel oxygen reduction unit defining a stripping gas flowpath and a liquid fuel flowpath. The method further includes at (304) transferring an amount of oxygen from the flow of liquid fuel through the liquid fuel flowpath to a flow of stripping gas through the stripping gas flowpath. Such may be accomplished using a contactor and a separator, a membrane transfer system, a chemical transfer arrangement, or any other suitable configuration or combination of configurations.

Referring still to FIG. 9, for the exemplary aspect of the method 300 shown, using the fuel oxygen reduction unit at (301) includes at (306) extracting a flow of oxygen from the flow of stripping gas through the stripping gas flowpath with an oxygen conversion unit. Extracting the flow of oxygen from the flow of stripping gas through the stripping gas flowpath with the oxygen conversion unit at (306) may include extracting the oxygen using a catalyst and water hydrolysis system, a membrane-based conversion system, a chemical conversion system, or any other suitable arrangement or configuration.

Further, for the exemplary aspect of the method 300 shown, using the fuel oxygen reduction unit at (301) at (308) providing the extracted flow of oxygen from the oxygen conversion unit to a system external to the fuel oxygen reduction unit. The system external to the fuel oxygen reduction unit may be an accessory system of an aircraft.

Alternatively, for example, if incorporated into a different vehicle or platform, the system external to the fuel oxygen reduction unit may be any other suitable system. Moreover, regardless of the vehicle or platform, the external system may be any system outside the fuel oxygen reduction unit, such as one or more of an environmental control system (ECS), a cabin air maintenance system, a cabin and/or crew oxygen delivery system, etc. In certain embodiments, the external system may be any system that uses and/or stores the oxygen and is located external of a gas turbine engine utilizing or incorporating the fuel oxygen reduction unit, such as at a location external to an engine core cowl and/or nacelle.

Further aspects of the invention are provided by the subject matter of the following clauses:

A fuel oxygen reduction unit assembly for a fuel system, the fuel oxygen reduction unit assembly comprising: a fuel oxygen reduction unit located downstream from the fuel source and defining a stripping gas flowpath and a liquid fuel flowpath, the fuel oxygen reduction unit comprising a means for transferring an amount of oxygen from a liquid fuel flow through the liquid fuel flowpath to a gas flow through the stripping gas flowpath; and an oxygen conversion unit in flow communication with the stripping gas flowpath configured to extract a flow of oxygen from a gas flow through the stripping gas flowpath, the oxygen conversion unit defining an oxygen outlet configured to provide the extracted flow of oxygen to an external system.

The fuel oxygen reduction unit assembly of one or more of these clauses, wherein the fuel system is a fuel system for an aircraft, and wherein the external system is an accessory system of the aircraft.

The fuel oxygen reduction unit assembly of one or more of these clauses, wherein the means for transferring the amount of oxygen from the liquid fuel flow to the gas flow comprises: a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, a liquid fuel outlet, and a stripping gas outlet.

The fuel oxygen reduction unit assembly of one or more of these clauses, wherein the means for transferring the amount of oxygen from the liquid fuel flow to the gas flow comprises a membrane fuel oxygen reduction unit.

The fuel oxygen reduction unit assembly of one or more of these clauses, wherein the oxygen conversion unit is a static member.

The fuel oxygen reduction unit assembly of one or more of these clauses, wherein the oxygen conversion unit comprises a membrane defining a porous structure configured to filter out oxygen from the gas flow through the stripping gas flowpath.

The fuel oxygen reduction unit assembly of one or more of these clauses, wherein the oxygen conversion unit comprises a catalyst, wherein the catalyst is configured to generate water from the gas flow through the stripping gas flowpath.

The fuel oxygen reduction unit assembly of one or more of these clauses, wherein the oxygen conversion unit further comprises a water hydrolysis device for generating a flow of oxygen from the water generated by the catalyst.

The fuel oxygen reduction unit assembly of one or more of these clauses, wherein the water hydrolysis device is a water electrolysis device.

The fuel oxygen reduction unit assembly of one or more of these clauses, wherein the oxygen conversion unit is in flow communication with the stripping gas flowpath at a location downstream from the means for transferring the amount of oxygen from the liquid fuel flow through the liquid fuel flowpath to the gas flow through the stripping gas flowpath.

The fuel oxygen reduction unit assembly of one or more of these clauses, wherein the oxygen conversion unit is in flow communication with the stripping gas flowpath at a location upstream from the means for transferring the amount of oxygen from the liquid fuel flow through the liquid fuel flowpath to the gas flow through the stripping gas flowpath.

The fuel oxygen reduction unit assembly of one or more of these clauses, further comprising: a sensor operable with the fuel oxygen reduction unit for sensing data indicative of a gas flow through the oxygen outlet of the oxygen conversion unit.

The fuel oxygen reduction unit assembly of one or more of these clauses, wherein the sensor is configured to sense data indicative of an oxygen content of the gas flow through the oxygen outlet, of a fuel content of the gas flow through the oxygen outlet, or both.

The fuel oxygen reduction unit assembly of one or more of these clauses, utilized in an aircraft of one or more of these clauses.

The fuel oxygen reduction unit assembly of one or more of these clauses, utilized in a method of one or more of these clauses.

An aircraft comprising: an accessory system; and a fuel delivery system comprising a fuel source and a fuel oxygen reduction unit located downstream from the fuel source and defining a stripping gas flowpath and a liquid fuel flowpath, the fuel oxygen reduction unit comprising a means for transferring an amount of oxygen from a liquid fuel flow through the liquid fuel flowpath to a gas flow through the stripping gas flowpath; and an oxygen conversion unit in flow communication with the stripping gas flowpath configured to extract oxygen from a gas flow therethrough, the oxygen conversion unit defining an oxygen outlet in airflow communication with the accessory system of the aircraft.

The aircraft of one or more of these clauses, wherein the means for transferring the amount of oxygen from the liquid fuel flow to the gas flow comprises: a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, a liquid fuel outlet, and a stripping gas outlet.

The aircraft of one or more of these clauses, wherein the means for transferring the amount of oxygen from the liquid fuel flow to the gas flow comprises a membrane fuel oxygen reduction unit.

The aircraft of one or more of these clauses, wherein the oxygen conversion unit is a static member.

The aircraft of one or more of these clauses, wherein the oxygen conversion unit comprises a membrane defining a porous structure configured to filter out oxygen from the gas flow through the stripping gas flowpath.

The aircraft of one or more of these clauses, utilizing a fuel oxygen reduction unit of one or more of these clauses.

The aircraft of one or more of these clauses, utilized in an method of one or more of these clauses.

A method of operating a fuel oxygen reduction unit for a fuel system, method comprising: providing a flow of liquid fuel to a fuel oxygen reduction unit located downstream from a fuel source, the fuel oxygen reduction unit defining a stripping gas flowpath and a liquid fuel flowpath; transferring an amount of oxygen from the flow of liquid fuel through the liquid fuel flowpath to a flow of stripping gas through the stripping gas flowpath; extracting a flow of oxygen from the flow of stripping gas through the stripping gas flowpath with an oxygen conversion unit; and providing the extracted flow of oxygen from the oxygen conversion unit to a system external to the fuel oxygen reduction unit.

A method, comprising: using a fuel oxygen reduction unit, wherein using the fuel oxygen reduction unit comprises extracting oxygen from liquid fuel, and providing the extracted oxygen to an external system.

A method of one or more of these clauses, wherein the external system comprises one or more of any of the following: a system external to the fuel oxygen reduction unit; an environmental control system (ECS); a cabin air maintenance system; a cabin oxygen delivery system, a crew oxygen delivery system, or both; and an oxygen consuming or storing system located outside of an engine core cowl or an engine nacelle of an engine incorporating or using the fuel oxygen reduction unit.

A method of one or more of these clauses, wherein the using step further comprises: receiving a flow of liquid fuel with the fuel oxygen reduction unit; wherein extracting oxygen from liquid fuel comprises transferring an amount of oxygen from a flow of the liquid fuel to a flow of stripping gas, and extracting a flow of oxygen from the flow of stripping gas with an oxygen conversion unit.

A method of one or more of these clauses, wherein the fuel system is a fuel system for an aircraft, and wherein the system external to the fuel oxygen reduction unit is an accessory system of the aircraft.

A method of one or more of these clauses, utilizing a fuel oxygen reduction unit of one or more of these clauses.

A method of one or more of these clauses, utilizing an aircraft of one or more of these clauses.

What is claimed is:

1. An aircraft comprising:
    an accessory system; and
    a fuel delivery system comprising:
    a fuel oxygen reduction unit including a contactor and a separator in serial flow order;
    a liquid fuel supply path fluidly coupled to a fuel tank and to the contactor for transporting the liquid fuel from the fuel tank to the contactor;
    a stripping gas supply path in airflow communication with the fuel tank and the contactor for transporting a gas from an ullage portion of the fuel tank to the contactor;
    a liquid fuel outlet path in fluid communication with a liquid fuel outlet of the separator;
    a stripping gas return path in airflow communication with the separator and the ullage portion of the fuel tank for returning the gas back to the fuel tank;
        a first gas oxygen reduction unit positioned in the stripping gas supply path upstream of the contactor and downstream of the fuel tank;
    a second gas oxygen reduction unit positioned in the stripping gas return path upstream of the fuel tank downstream of the contactor, and downstream of the first gas oxygen reduction unit such that the contactor is disposed between the first gas oxygen reduction unit and the second gas oxygen reduction unit and the fuel tank is disposed downstream of the second gas oxygen reduction unit such that the fuel tank is disposed between the first gas oxygen reduction unit and the second gas oxygen reduction unit; and
    wherein the fuel oxygen reduction unit further comprises a water hydrolysis device for generating a flow of oxygen from the water generated by a first catalyst, and wherein the water hydrolysis device is a water electrolysis device.

2. A fuel delivery system for a gas turbine engine, comprising:
    a fuel tank, wherein the fuel tank contains a liquid fuel and a gas, wherein the gas is disposed within an ullage portion of the fuel tank;
    a fuel oxygen reduction unit including a contactor and a separator in serial flow order;
    a liquid fuel supply path fluidly coupled to the fuel tank and to the contactor for transporting the liquid fuel from the fuel tank to the contactor;
    a stripping gas supply path in airflow communication with the fuel tank and the contactor for transporting the gas from the ullage portion of the fuel tank to the contactor;

a liquid fuel outlet path in fluid communication with a liquid fuel outlet of the separator;

a stripping gas return path in airflow communication with the separator and the ullage portion of the fuel tank for returning the gas back to the fuel tank;

a first gas oxygen reduction unit positioned in the stripping gas supply path upstream of the contactor and downstream of the fuel tank;

a second gas oxygen reduction unit positioned in the stripping gas return path upstream of the fuel tank downstream of the contactor, and downstream of the first gas oxygen reduction unit such that the contactor is disposed between the first gas oxygen reduction unit and the second gas oxygen reduction unit and the fuel tank is disposed downstream of the second gas oxygen reduction unit such that the fuel tank is disposed between the first gas oxygen reduction unit and the second gas oxygen reduction unit; and wherein the fuel oxygen reduction unit further comprises a water hydrolysis device for generating a flow of oxygen from the water generated by a first catalyst, and wherein the water hydrolysis device is a water electrolysis device.

3. The fuel delivery system of claim 2, wherein the fuel oxygen reduction unit further comprises a flame arrester disposed within the stripping gas supply path between the ullage portion of the fuel tank and the contactor.

4. The fuel delivery system of claim 2, wherein the fuel oxygen reduction unit further comprises the first catalyst in air communication with the stripping gas supply path and disposed between the ullage portion of the fuel tank and the contactor.

5. The fuel delivery system of claim 4, wherein the first catalyst is in airflow communication with an accessory system of an aircraft.

6. The fuel delivery system of claim 4, wherein the fuel oxygen reduction unit further comprises a first heat exchanger in thermal communication with the stripping gas supply path, wherein the first heat exchanger is disposed between the ullage portion of the fuel tank and the first catalyst.

7. The fuel delivery system of claim 4, wherein the first catalyst comprises an oxygen outlet and wherein the fuel oxygen reduction unit further comprises a sensor operable with the first catalyst for sensing data indicative of a gas flow through the oxygen outlet.

8. The fuel delivery system of claim 7, wherein the sensor is configured to sense data indicative of an oxygen content of the gas flow through the oxygen outlet, of a fuel content of the gas flow through the oxygen outlet, or both.

9. The fuel delivery system of claim 4, wherein the first catalyst is configured to generate water from a gas flow through the stripping gas supply path.

10. The fuel delivery system of claim 2, wherein the fuel oxygen reduction unit further comprises a second catalyst in air communication with the stripping gas return path and disposed between the separator and the ullage portion of the fuel tank.

11. The fuel delivery system of claim 10, wherein the fuel oxygen reduction unit further comprises a second heat exchanger in thermal communication with the stripping gas return path, wherein the heat exchanger is disposed between the second catalyst and the ullage portion of the fuel tank.

12. The fuel delivery system of claim 2, wherein the gas turbine engine comprises a combustion section, wherein the combustion section is in fluid communication with the liquid fuel outlet of the separator.

13. The fuel delivery system of claim 2, wherein the liquid fuel outlet of the separator is fluidly coupled to the fuel tank.

* * * * *